United States Patent
Song et al.

(10) Patent No.: US 7,133,944 B2
(45) Date of Patent: Nov. 7, 2006

(54) MEDIA ACCESS CONTROLLER WITH POWER-SAVE MODE

(75) Inventors: Hae-Jin Song, Sungnam (KR); Kab-Joo Lee, Sungnam (KR); Yong-Mi Lee, Suwon (KR)

(73) Assignee: Samsung Electronics, Co., Ltd. (KR)

( * ) Notice: Subject to any disclaimer, the term of this patent is extended or adjusted under 35 U.S.C. 154(b) by 360 days.

(21) Appl. No.: 10/756,974

(22) Filed: Jan. 14, 2004

(65) Prior Publication Data

US 2004/0151149 A1 Aug. 5, 2004

(30) Foreign Application Priority Data

Feb. 4, 2003 (KR) .................. 10-2003-0006876

(51) Int. Cl.
*G06F 13/00* (2006.01)
(52) U.S. Cl. ............... 710/100; 710/240; 710/306; 710/305; 713/300; 713/600
(58) Field of Classification Search ........ 710/305–306, 710/100, 240; 713/300, 600
See application file for complete search history.

(56) References Cited

U.S. PATENT DOCUMENTS 6,934,870 B1 * 8/2005 Amos ................. 713/501

2003/0226050 A1 * 12/2003 Yik et al. ................. 713/324
2004/0098530 A1 * 5/2004 Earl et al. ................. 710/315

* cited by examiner

Primary Examiner—Rehana Perveen
Assistant Examiner—Kim T. Huynh
(74) Attorney, Agent, or Firm—Mills & Onello LLP

(57) ABSTRACT

There is provided a media access controller with a power-save mode. Particularly, the media access controller of the present invention minimizes power loss by disabling clocks applied to all blocks, including CPU, of the media access controller during the power-save mode. The media access controller of the present invention includes: a power-save master for securing stable transmission/reception of data through bus by respective processors contained in the controller; a wake-up timer for noticing that the power-save mode is expired; a power control unit for determining whether to supply a power to a phase-locked loop, and a timing when clocks for the media access controller are applied and disabled; and a locktime register for storing a locktime when an output of the phase-locked loop is settled. Additionally, there is provided a method of efficiently changing the media access controller from the active mode to the power-save mode, and vice versa.

11 Claims, 12 Drawing Sheets

MEDIA ACCESS CONTROLLER WITH POWER-SAVE MODE

BACKGROUND OF THE INVENTION

Related Applications

This application relies for priority on Korean patent application number 2003-06876, filed on Feb. 4, 2003, the contents of which are incorporated herein in their entirety by reference.

1. Field of the Invention

The present invention relates to a media access controller with a power-save function in a wireless LAN. A media access control layer is part of a data link layer, i.e., the second layer among seven (7) layers of an Open System Interconnection (OSI), and defines a control method of enabling LAN terminals sharing the same transmission line to efficiently use the transmission line.

2. Description of the Related Art

FIG. 1 illustrates basic elements of a wireless local access network (LAN) system provided by IEEE 802.11, which is a standard for a physical layer and a media access control layer in a wireless LAN. A basic unit of the IEEE 802:11 system is basic service sets 101 and 102. In general, the basic service sets are provided with one or more stations 105 and one central base station, referred to as an access point (AP) 103 and 104. The access points (APs) are connected to each other through a distribution system 100, or to other communication networks such as wired or wireless networks.

Additionally, IEEE 802.11 suggests a power management protocol for the media access controller (MAC) so as to reduce power loss of the wireless LAN device. The power management protocol suggested by IEEE 802.11 is classified into two modes, i.e., an active mode and a power-save mode, according to power states of each station 105. The active mode represents that each station operates normally and the power-save mode represents that each station is controlled to reduce unnecessary power consumption when transmission/reception of data through networks are not needed.

During the power-save mode, the stations 105 may sustain data loss since it is impossible for the stations to receive data transmitted to them. Accordingly, stations 105 entering the power-save mode must be changed to the active mode after a predetermined time so as to check data transmitted to them during the power-save mode. Thereafter, data transmitted to each station 105 during the power-save mode is buffered at the access points 103 and 104 of the basic service sets 101 and 102 including each station 105, and then the buffered data are transmitted to each station when each station 105 changes from the power-save mode to the active mode.

As shown in FIG. 2, a time interval in a change from the power-save mode to the active mode is determined by a time interval TDTIM between delivery traffic indication messages (hereinafter, referred to as DTIMs). A basic unit of the TDTIM is a time interval TB referred to as beacon, at which the access points 103 and 104 transmit network information to the basic service sets 101 and 102. As shown in FIG. 2, each station is in a state of the power-save mode during TPS, so that unnecessary power loss is prevented during that time.

FIG. 3 is a basic hardware structure of a general media access controller. Referring to FIG. 3, physical layer interface unit 308 performs an interface function between a physical layer and a media access control layer. Host interface unit 301 performs an interface function between a host and the media access controller. A central processing unit (hereinafter, referred to as CPU) 310 drives the media access controller. Register unit 302 stores information for controlling the media access controller. Local bus 300 connects various peripheral devices 311 with each other. Bus interface unit 304 functions as a bus arbiter and supplies a clock to the media access controller.

Referring to FIG. 4, a general power-save method used in the conventional media access controller disables clocks supplied to each peripheral block 402, 403 and 404 by setting a register 303 which is controllable in software. However, operation of the CPU should be maintained normally at a corresponding time period since the method is carried out in software, so that it is necessary to supply clocks continuously. Thus, unnecessary power loss occurs in the media access controller.

SUMMARY OF THE INVENTION

Accordingly, the present invention is directed to a media access controller with a power-save mode that substantially obviates one or more problems due to limitations and disadvantages of the related art.

It is an object of the present invention to provide a media access controller with a power-save mode, which can minimize power loss.

It is another object of the present invention to provide a method of efficiently changing a media access controller from an active mode to a power-save mode, and vice versa.

In accordance with one aspect of the invention, there is provided a media access controller. The media access controller includes a local bus for connecting blocks of the media access controller with each other. A CPU is connected with the local bus to drive the media access controller. A register unit is connected with the local bus to store information used for a software control of the CPU with respect to internal units of the media access controller. A host interface unit is connected with the local bus to manage an interface between the media access controller and a host. A physical layer interface unit is connected with the local bus to manage an interface between the media access controller and a physical layer. A power-save master generates a signal for requesting an occupation/occupation expiration of the local bus in response to a signal inputted via the local bus and a value of the register. A bus arbiter generates a signal controlling a use of the local bus in response to the signal generated from the power-save master. A power control unit generates signals determining whether to supply clocks and power to the respective blocks of the media access controller, in response to the control signal of the bus arbiter, the register values inputted via the local bus, and a power-save mode exiting signal provided from other blocks of the media access controller. A phase-locked loop generates clocks in response to the signal determining whether to supply the power, the signal being generated from the power control unit. A clock generator receives the phase-locked clock from the phase-locked loop to generate clocks required to the media access controller, and supplies or disables the clocks generated according to the signal determining whether to supply the clock, the signal being generated from the power control unit. A wake-up timer applies a power-save mode exiting signal to the power control unit in response to the signals inputted from the local bus and the clock generator.

In one embodiment, a direct connection method is employed when supplying the power and clocks to respective processors of the media access controller according to the power-save mode exiting signal.

In one embodiment, the register unit includes a clock disable register and a locktime register. The locktime register can store a time required until an output of the phase-locked loop is settled.

In one embodiment, the power control unit generates a plurality of state control signals PLL_PWDN, PLL_STA and CLK_EN for controlling the power and clocks of the media access controller, in response to a first control signal MST from the bus arbiter, a second control signal WKUP from the wake-up timer, a first input value VLOC from the locktime register, and a second input value VSTB from the clock disable register.

The power-save master can generate one signal for requesting the occupation/occupation expiration of the bus, in response to the second input value VSTB from the clock disable register and the signal PLL_STA from the power control unit. The power-save master can be implemented with one register.

In one embodiment, the clock generator supplies or disables the clocks to the respective blocks of the media access controller in response to any one of the state control signals generated from the power control unit.

In one embodiment, the wake-up timer includes a wake-up time register for storing a time DTIM and a wake-up count register for counting the time DTIM. The wake-up timer can copy the time DTIM of the wake-up time register into the wake-up count register in response to a control signal MST from the bus arbiter in the power-save mode, and can count a value of the wake-up time register in synchronization with a low-speed clock divided from the clock generator.

In another aspect the invention is directed to a method of changing a media access controller to a power-save mode. The method includes the steps of: (a) initializing the media access controller by supplying a power thereto; (b) operating normally the media access controller in an active mode; (c) selecting the power-save mode of the media access controller; (d) setting a power control register of a physical layer interface unit provided within the media access controller; (e) setting a wake-up time value to a wake-up time register of the media access controller; (f) setting a stop bit to a clock disable register of the media access controller; (g) transmitting a bus occupation request signal from a power-save master of the media access controller to a bus arbiter; (h) checking whether or not there is a bus master which currently uses a bus of the media access controller; (i) disabling clocks supplied to the media access controller; and (j) powering down a phase-locked loop of the media access controller.

In one embodiment of the method, a locktime value is set to a locktime register of the media access controller in step (a). The locktime value can be a power stabilization time of the phase-locked loop of the media access controller.

In one embodiment, clocks supplied to external blocks connected with the media access controller are disabled by the value of the power control register set in step (d).

In one embodiment, the value of the wake-up time register set in step (e) is a power-save maintaining time of the media access controller.

In another aspect, the invention is directed to a media access controller from a power-save mode to an active mode. The method includes the steps of: (a) decreasing a value of a wake-up count register of the media access controller one bit by one bit until the value of the wake-up count register becomes one; (b) supplying a power to a phase-locked loop of the media access controller when the value of the wake-up count register becomes one; (c) decreasing a value of a locktime register of the media access controller one bit by one bit until the value of the locktime register becomes zero; (d) providing clocks to the media access controller; (e) expiring a bus occupation of a power-save master of the media access controller; and (e) clearing a stop bit stored in a clock disable register of the media access controller.

In one embodiment, the processes of changing the media access controller from the power-save mode to the active mode are achieved only through hardware.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
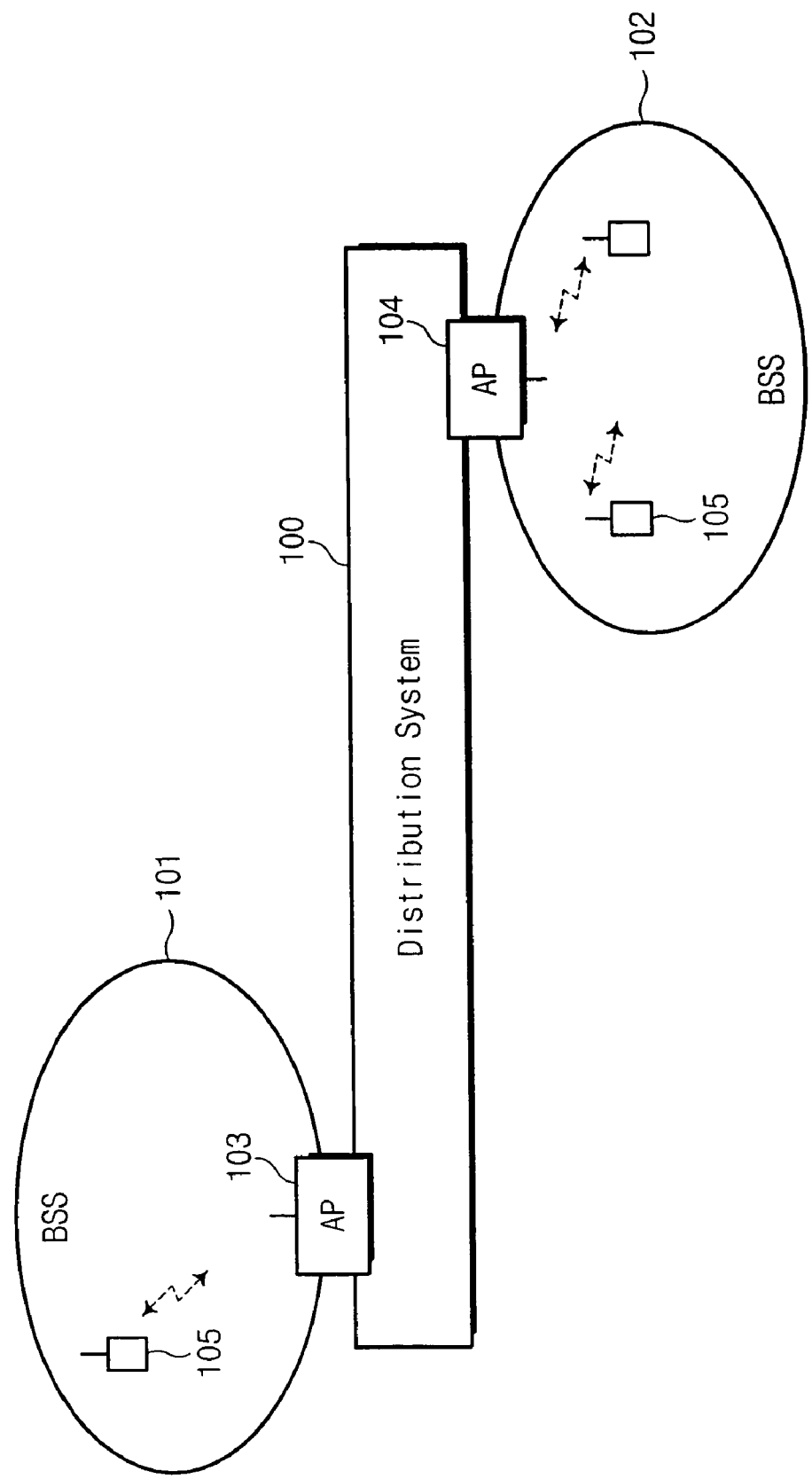
FIG. 1 is a configuration diagram of basic elements of IEEE 802.11 standard wireless LAN.
Figure 2:
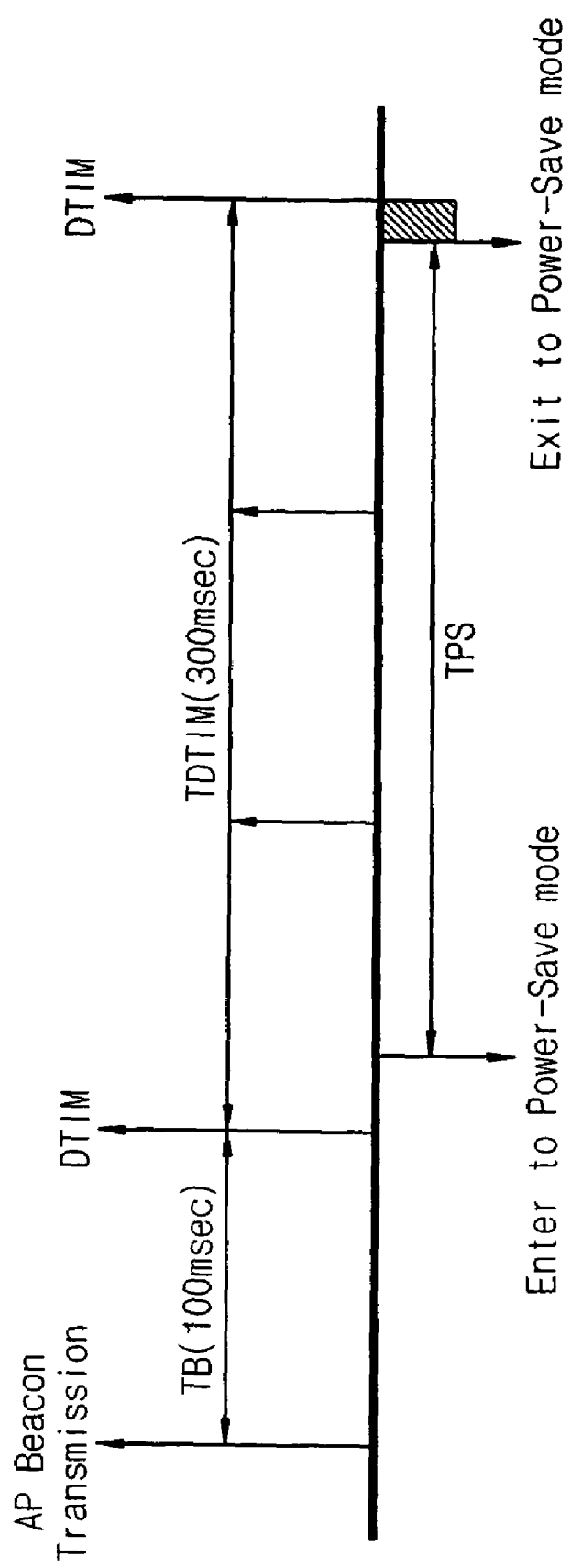
FIG. 2 is a timing chart showing a power management protocol provided by IEEE 802.11.
Figure 3:
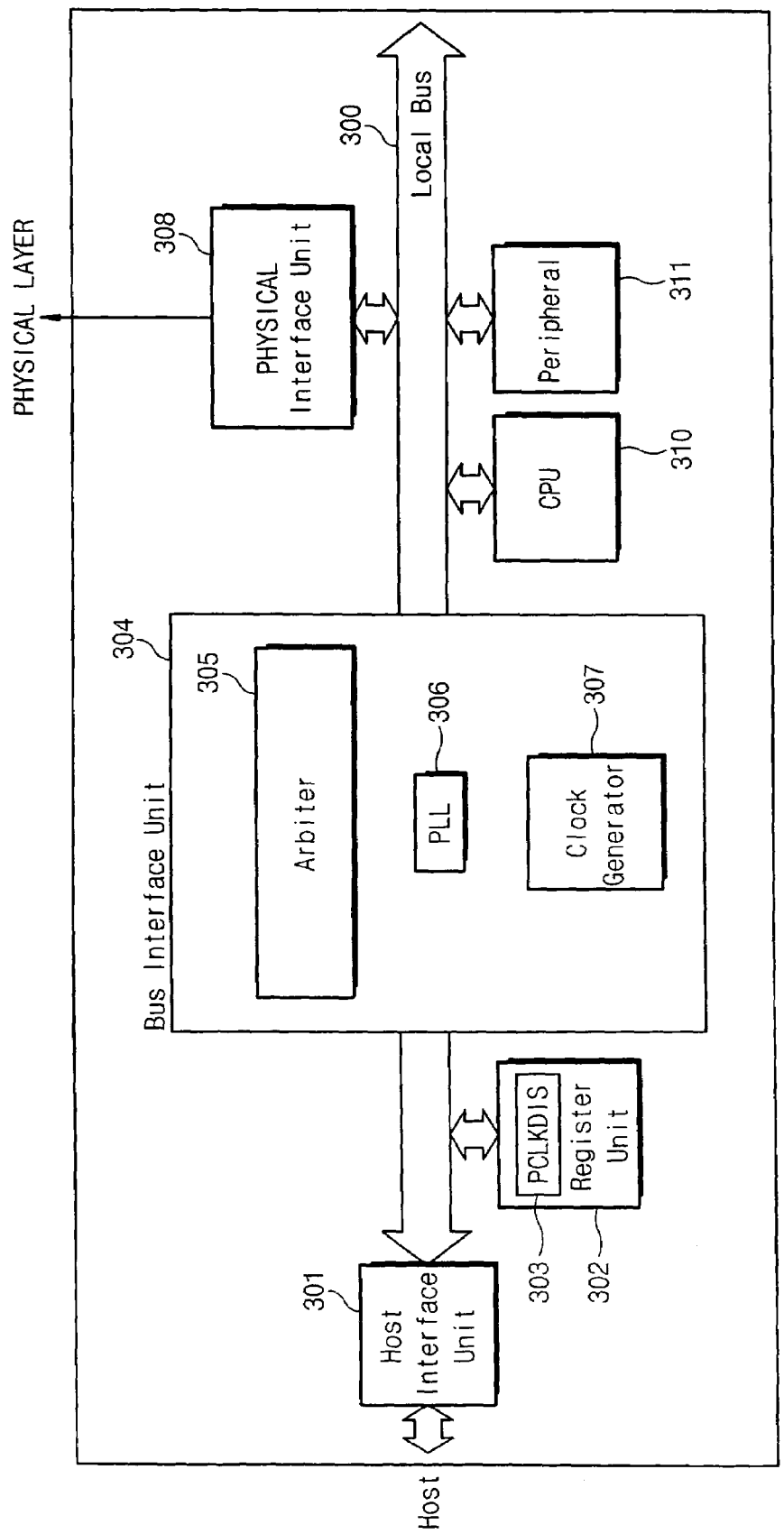
FIG. 3 is a block diagram of a general media access controller.
Figure 4:
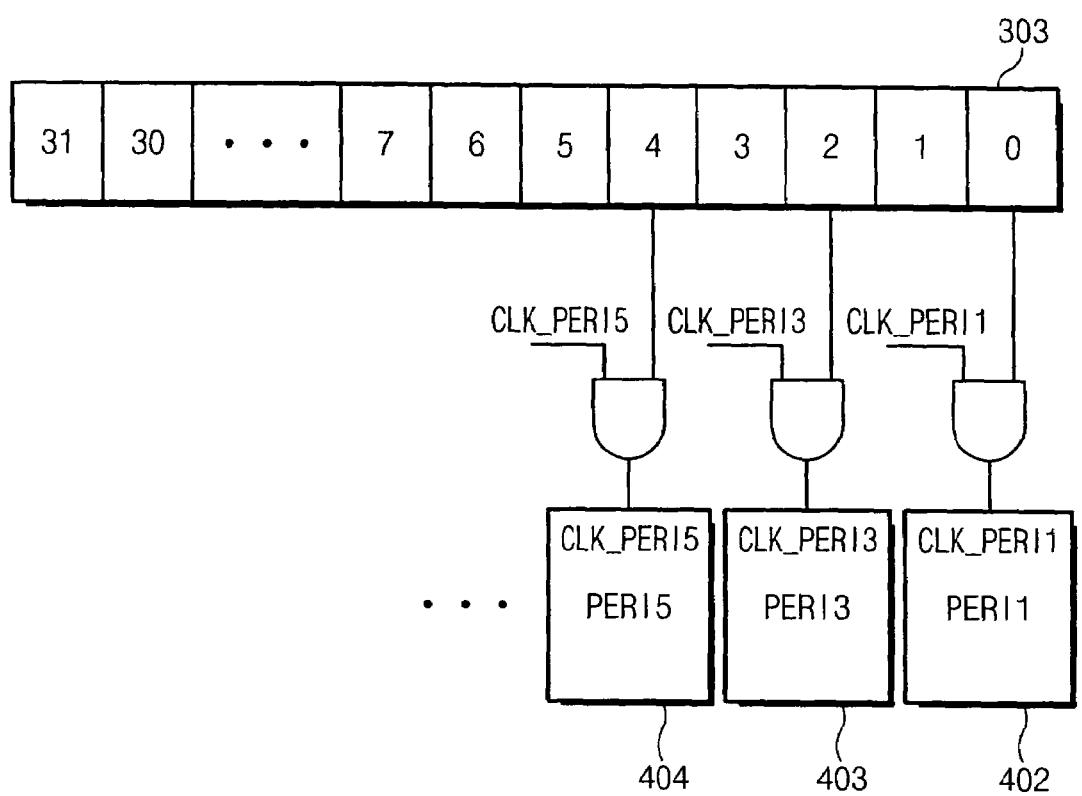
FIG. 4 illustrates a conventional peripheral power-down method using the clock disable register of FIG. 3.
Figure 5:
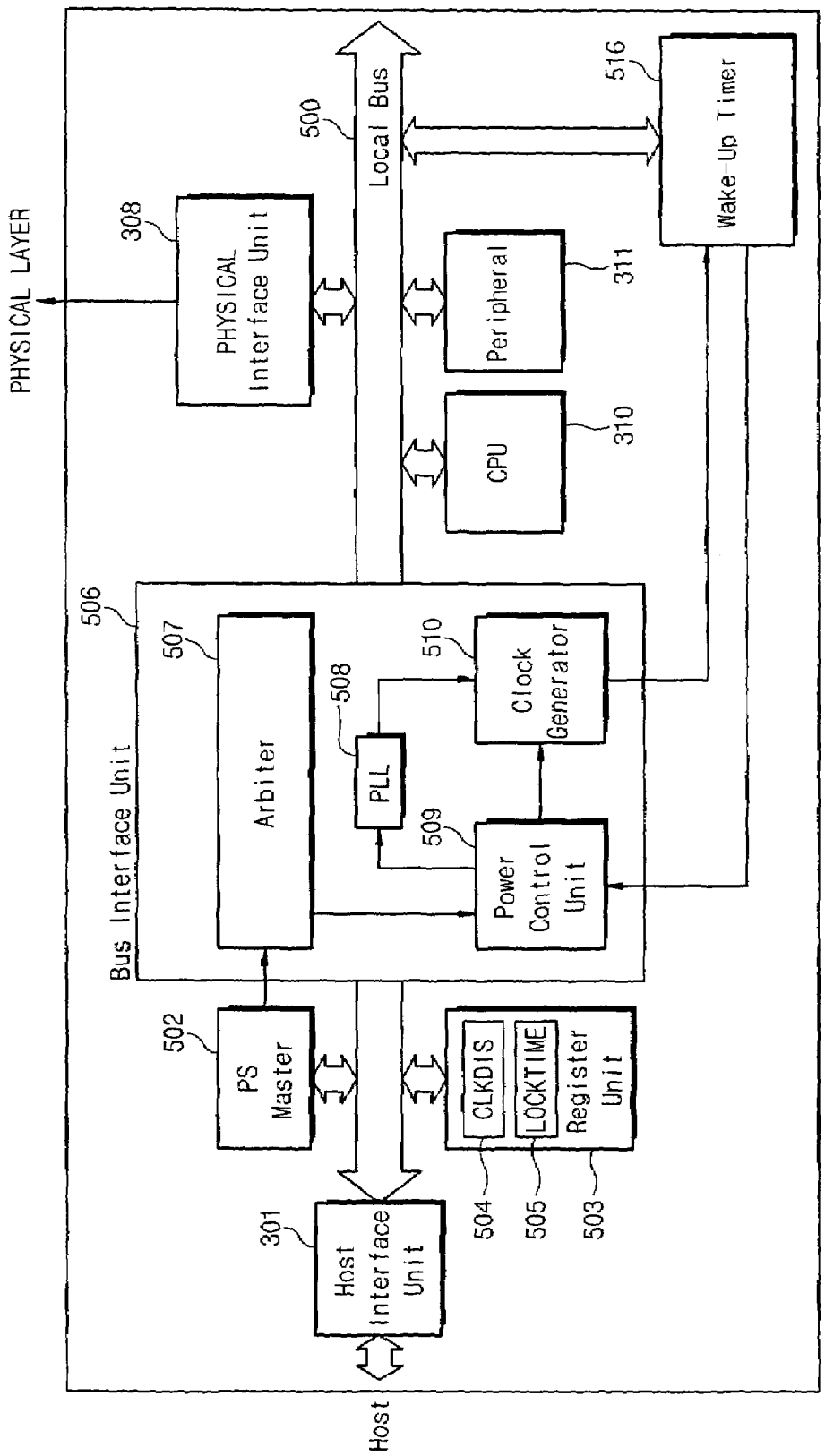
FIG. 5 is a block diagram of a media access controller according to the present invention.

Referring to FIG. 5, a media access controller according to the present invention is provided with a power-save master 502 securing stable transmission/reception of data through a bus, a wake-up timer 516 generating a signal for restarting the media access controller, which has entered a power-save mode, after a predetermined time, a bus interface unit 506 additionally including a power control unit 509 generating power used in an inside of the media access controller and clock enable/disable signal and a clock generator 510, and a register unit 503 additionally including a locktime register 505 storing a locktime, i.e., a time when an output of a phase-locked loop (hereinafter, referred to as PLL) 508 is settled and a clock disable register CLKDIS 504.

The power-save master 502 functions to secure stable transmission/reception of data through the bus 500 when the media access controller changes from an active mode to a power-save mode. If the power-save mode is selected to disable the clock while other processor uses the bus 500 to transmit data, loss of the transmitting data may occur. In order to prevent that, the power-save master 502 requests an occupation authority of the bus 500 to the bus arbiter 507 of the bus interface unit 506 before entering the power-save mode, and the bus arbiter 507 authorizes the power-save master 502 to occupy the bus 500 when transmission/reception of all previous single data through the bus 500 are completed. While the power-save master 502 occupies the bus 500, other processors are not permitted to occupy the bus 500.

Figure 6:
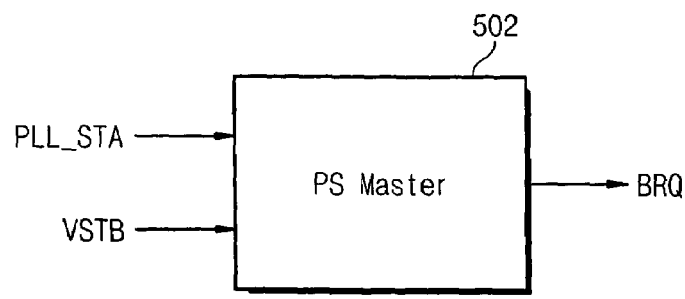
FIG. 6 is a configuration diagram showing input/output states of the power save master of FIG. 5.

FIG. 6 is a configuration diagram showing input/output states of the power-save master 502. The power-save master 502 receives a stop bit value VSTB stored in the clock disable register 504 and a pulse signal PLL_STA indicating that an output of the PLL 508 is settled, and outputs a bus request signal BRQ. That is, if the stop bit value VSTB of the clock disable register 504 is set in an active mode by software, the bus request signal BRQ is applied to request the bus occupation to the bus arbiter 507. If the pulse signal PLL_STA is applied in the power-save mode, the bus request signal BRQ is disabled to expire the bus occupation. The power-save master 502 is implemented with one register in order to reduce an increase of unnecessary hardware.

The bus arbiter 507 of the bus interface unit 506 checks whether the current bus 500 is occupied or not in response to the bus request signal BRQ of the power-save master 502. If there is no bus master occupying the current bus 500, the occupation authority of the bus 500 is preferentially permitted to the power-save master 502, and then a signal MST indicating that the power-save master 502 becomes the bus master is applied to the power control unit 509 and the wake-up timer 516. The bus arbiter 507 does not permit other processors to use the bus 500 while the power-save master 502 operates as the bus master, thereby preventing a change of the media access controller to the power-save mode, or data loss which may occur in the power-save mode.

The locktime register 505 is a register storing a locktime when the output of the PLL 508 is settled. The locktime register 505 is set in a system initialization by the CPU 310. Generally, it takes a predetermined time for an analog circuit such as the PLL 508 to output a normal clock after a power-on. Here, the time required is called a power-on settling time or a locktime. Since the time depends on states of chips used therein, the locktime register 505 is employed to prepare for that. The power control unit 509 uses a value VLOC of the locktime register to generate the pulse signal PLL_STA.

Figure 7:
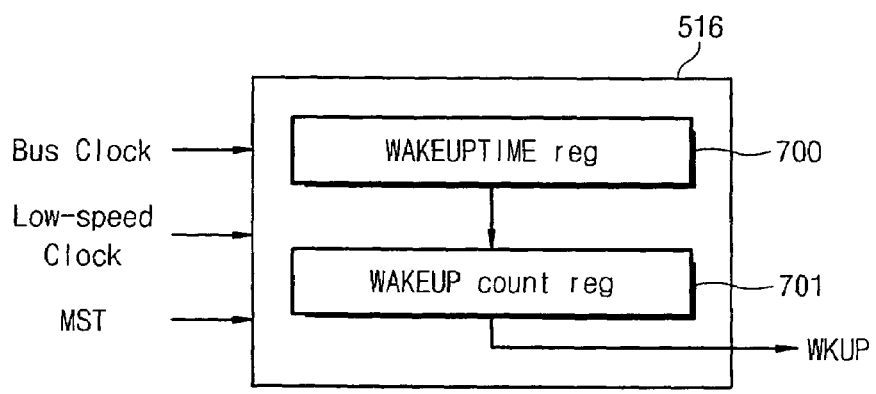
FIG. 7 is a configuration diagram showing input/output states of the wake-up timer of FIG. 5.

The wake-up timer 516 functions to generate a wake-up signal WKUP. In response to the wake-up signal WKUP, the blocks which have not woken up since the clocks are disabled in the power-save mode are made to wake up after the time interval TDTIM. As shown in FIG. 7, the wake-up timer 516 includes a wake-up time register 700 storing the time interval TDTIM, and a wake-up count register 701 copying and counting the value stored in the wake-up time register when entering the power-save mode.

Figure 8:
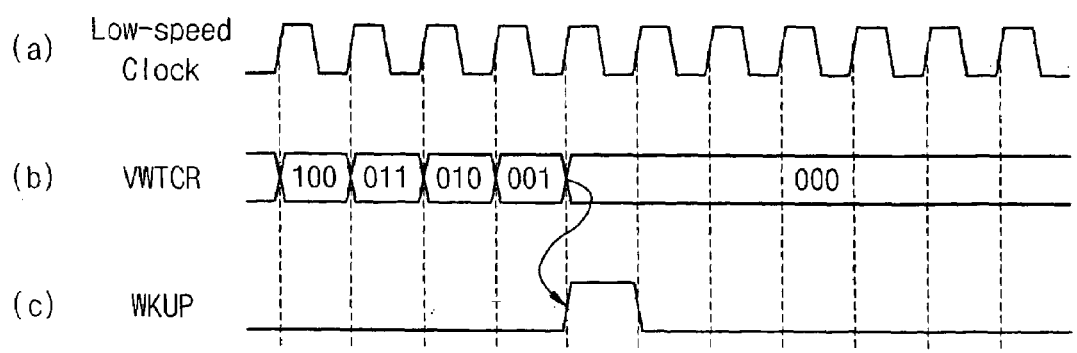
FIG. 8 is a timing chart of the wake-up timer of FIG. 7.

When the power-save master 502 becomes the bus master, the wake-up timer 516 copies the value of the wake-up time register 700 into the wake-up count register 701. Thereafter, as shown in FIG. 8, the wake-up timer 516 decreases the value VWTCR of the wake-up count register one by one until the value VWTCR becomes one. Then, when the value VWTCR becomes one, the wake-up signal WKUP is generated.

An interrupt method is generally used to apply the wake-up signal. In this case, the interrupt method has a limitation that clocks should be applied in advance to an interrupt controller or CPU, and requires many hardware resources for controlling the interrupt.

The wake-up time register 700 employed in the present invention is a 32-bit register. The wake-up time register 700 stores the time interval TDTIM set by software and counted by a clock with a period of 10 µs, so that a maximum TDTIM becomes 11 hours.

Figure 9A:
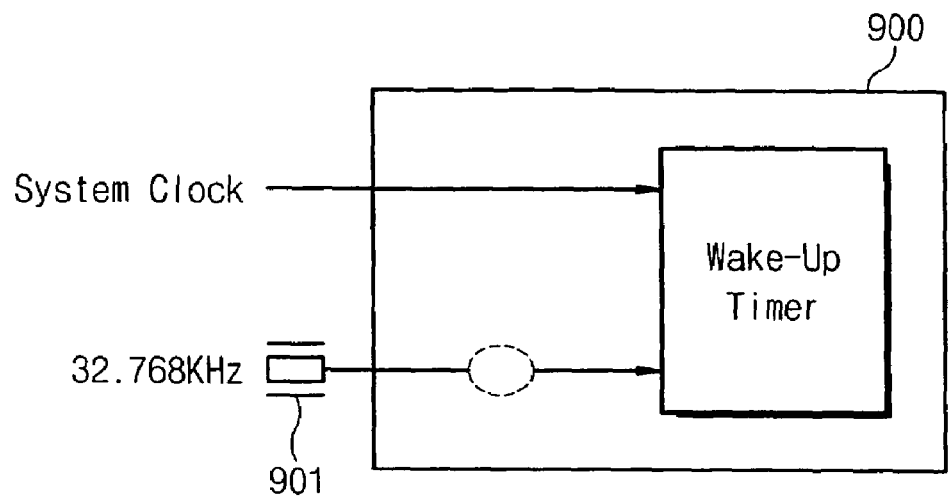
FIGS. 9A and 9B illustrate a difference in clock supply methods between the wake-up timer of FIG. 5 and a wake-up timer provided by another source.
Figure 9B:
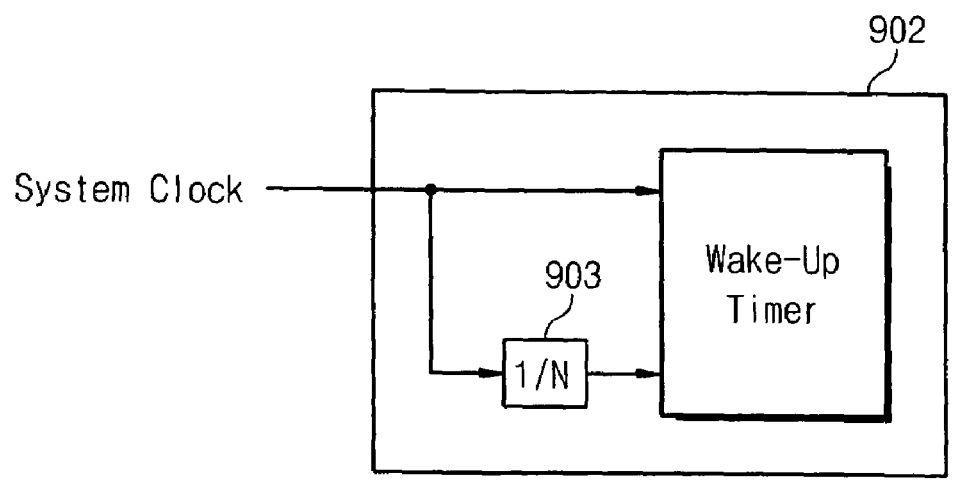

FIG. 9A shows a conventional clock supply method (PRISM3 manufactured by INTERSIL Corporation) in the power-save mode, in which an independent dedicated oscillator is used to supply clocks. On the other hand, FIG. 9B shows a clock supply approach according to the present invention. Referring to FIG. 9B, a clock is internally divided into a low-speed clock and supplied to the wake-up timer during the power-save mode, thereby enhancing spatial efficiency of the board.

When entering the power-save mode, the power control unit 509 determines a power-down timing of the PLL 508 and a clock disable timing of the media access controller. When exiting from the power-save mode, the power control unit 509 determines a power-on timing and a clock enable timing.

Figure 10:
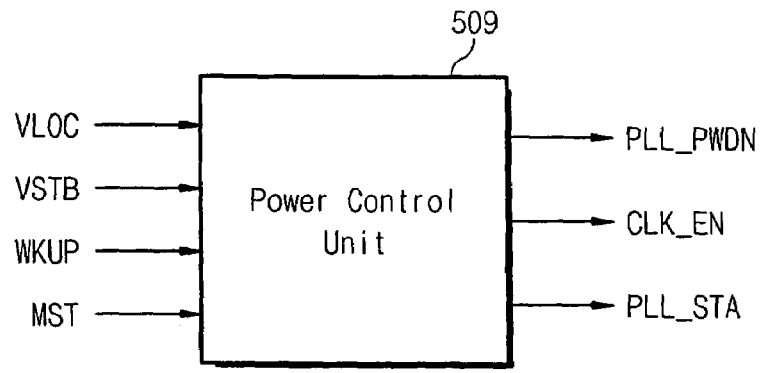
FIG. 10 is a configuration diagram showing input/output states of the power control unit of FIG. 5.

FIG. 10 is a configuration diagram showing input/output states of the power control unit 509. The power control unit 509 receives the value VLOC of the locktime register 505, the stop bit value VSTB stored in the clock disable register 504, the wake-up signal WKUP of the wake-up timer 516 and the signal MST, and outputs a signal PLL_PWDN for power-down of the PLL 508, a signal CLK_EN for determining whether to apply a clock to the media access controller, and the PLL_STA signal indicating that the output of the PLL 508 is settled.

Figure 11:
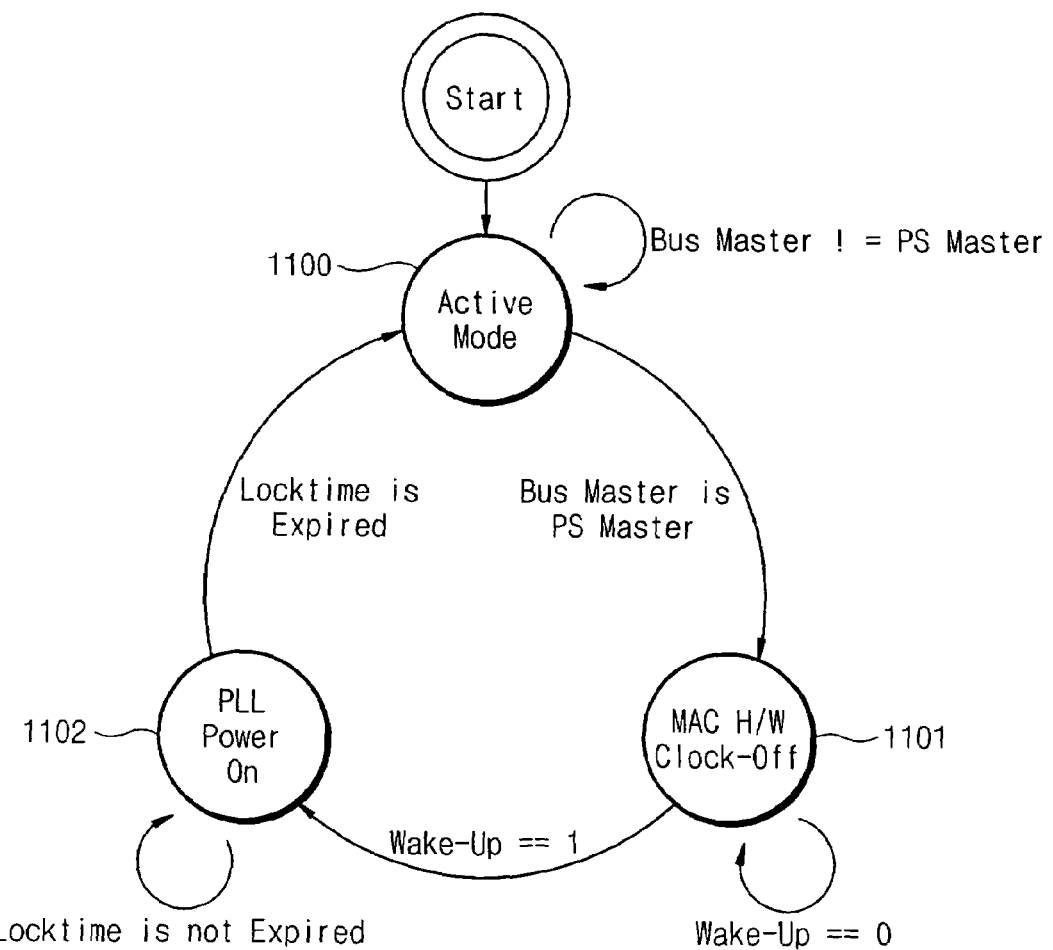
FIG. 11 is a state transition diagram of the power control unit shown in FIG. 10.

FIG. 11 is a state transition diagram of the power control unit 509.

If the power-save master 502 is the bus master of the media access controller in the active mode, the signal MST is applied by the bus arbiter 507 and the PLL 508 is powered down. Then, all the clocks supplied to the media access controller by a clock generator are off (1101), so that the media access controller enters the power-save mode. If the output of the PLL 508 is settled and the stop bit is disabled after the locktime elapses since the PLL 508 is powered on in response to the wake-up signal of the wake-up timer 516 (1102), the clock generator 510 supplies the clocks to the media access controller, so that the media access controller enters the active mode (1100).

Embodiments of the present invention are classified into two cases. One is a process of changing the media access controller from the active mode to the power-down mode, and the other is a process of changing the media access controller from the power-down mode to the active mode.

Figure 12:
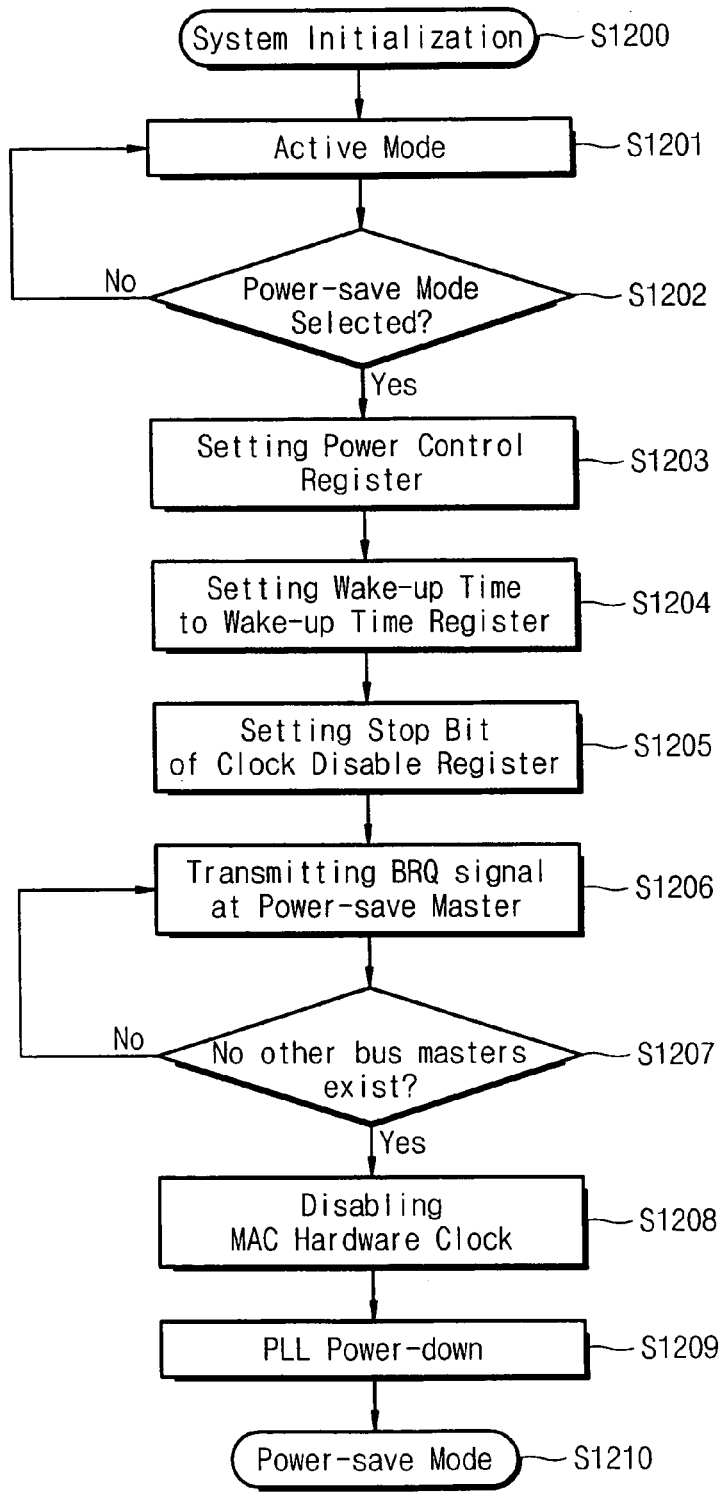
FIG. 12 is a flowchart showing a change from an active mode to a power-save mode according to the present invention.

FIG. 12 is a flowchart showing a change from the active mode to the power-down mode according to the present invention. First, if an initial power is supplied to the media access controller to initialize the system (S1200), the media access controller enters the active mode automatically (S1201). At this time, the locktime value is automatically stored into the locktime register 505 by the CPU 513. Thereafter, if the power-save mode is selected by the CPU 513 while the media access controller operates normally in the active mode (S1202), the CPU 513 breaks the power of external wireless-terminal chips (not shown) connected with the media access controller by setting the power control register of the physical interface unit 511 (S1203). At the same time, the wake-up time of the wake-up time register 700 is set to 10 μs (S1204), and the stop bit value VSTB of the clock disable register 504 is set (S1205).

The above steps S1201 to S1205 are processed in software by the CPU 513 when entering the power-save mode. The following steps are processed by hardware.

If the stop bit value VSTB is set at the step S1205, the bus request signal BRQ is applied by the power-save master 502 (S1206). If there is no other bus master (S1207), the bus arbiter 507 authorizes the power-save master 502 to occupy the bus in response to the applied bus request signal BRQ, and applies the signal MST to both the power control unit 509 and the wake-up timer 516. If the signal MST is applied, the wake-up timer 516 copies the wake-up time, which is set to the wake-up time register 700 at the step S1204, to the wake-up count register 701, and decreases the value one bit by one bit in synchronization with the internally-divided low-speed clock.

The power control unit 509 disables the signal CLK_EN and provides it to the clock generator 510, and the clock generator 510 disables the clocks supplied to the media access controller (S1208). At the same time, the power-down signal PLL_PWDN is applied to power down the PLL 508 (S1209), so that the media access controller enters the power-save mode (S1210).

Figure 13:
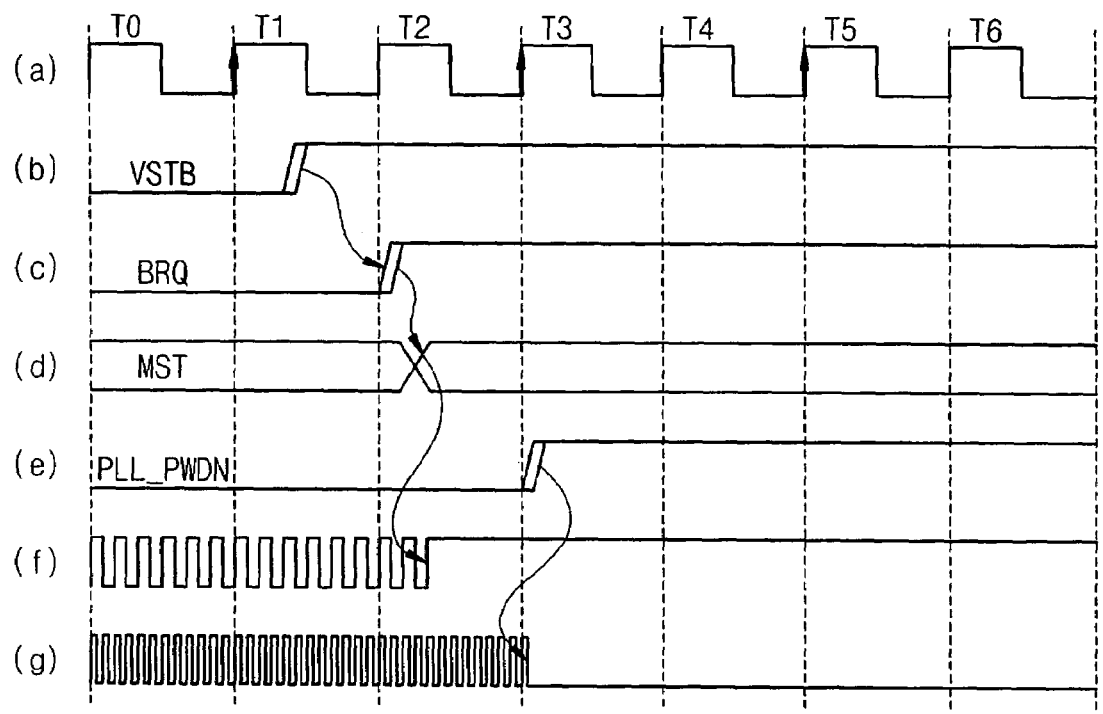
FIG. 13 is a timing chart showing an operation of hardware used for the process of FIG. 12.

FIG. 13 is a timing chart showing a hardware operation of the signals used in FIG. 12. In FIG. 13, the (a) waveform indicates an external clock inputted to the PLL 508, and the (b) waveform indicates the stop bit value VSTB set at the step S1205, showing that the stop bit value VSTB inputted to both the power-save master 502 and the power control unit 509 is set. The (c) waveform indicates that the bus request signal BRQ, i.e., the output of the power-save master 502, is applied according to the setup of the stop bit value VSTB. the (d) waveform indicates that the signal MST generated by the bus request signal BRQ is applied, and the (f) waveform indicates that the system clock is disabled due to the disabled CLK_EN signal which is the output of the power control unit 509 generated by applying the signal MST. The (e) waveform indicates that the signal PLL_PWDN is applied, and the (g) waveform indicates that the PLL 508 is powered down in response to the signal PLL_PWDN so that the clocks are not outputted any more.

Figure 14:
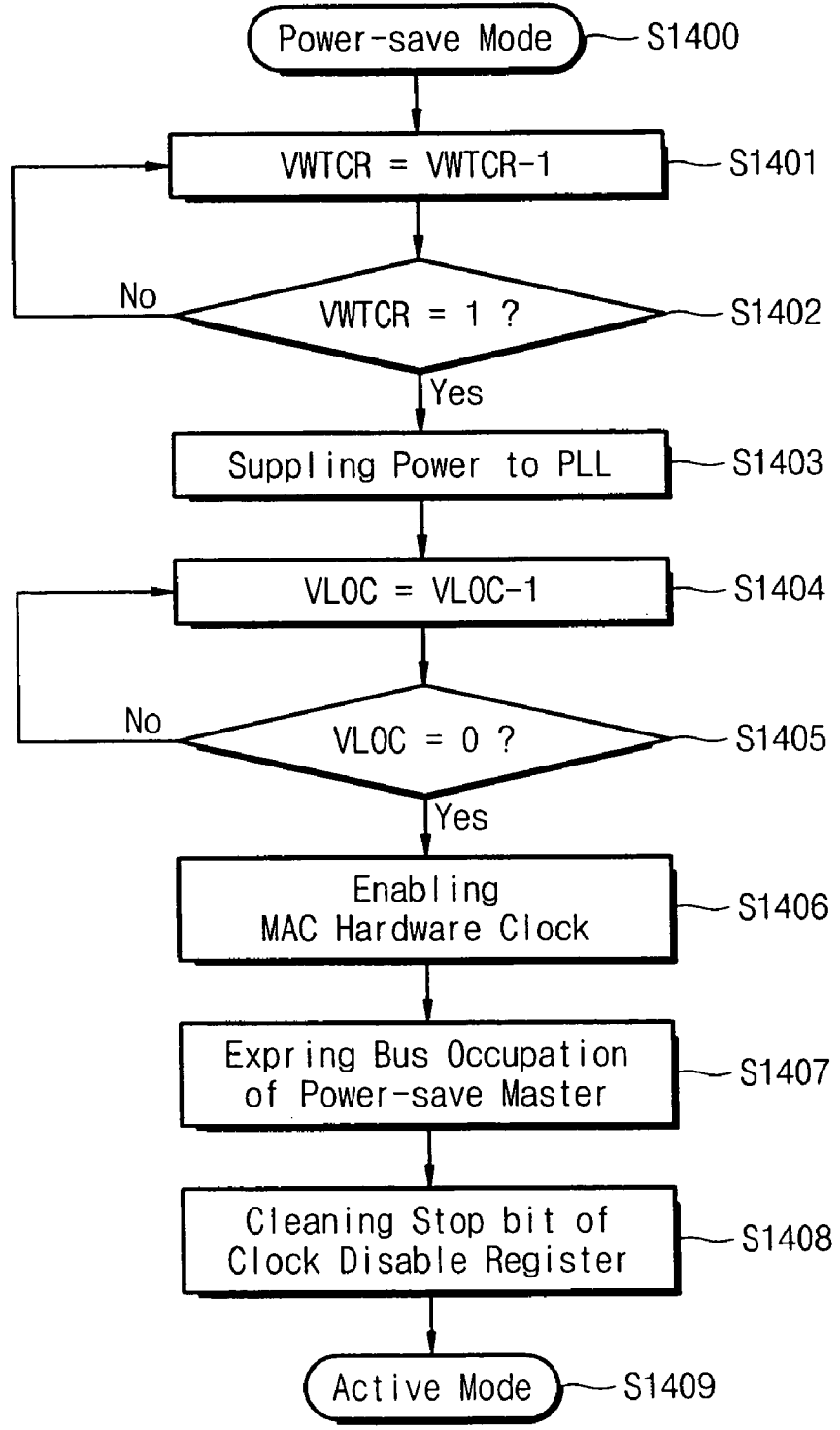
FIG. 14 is a flowchart showing a change from a power-save mode to an active mode according to the present invention.

FIG. 14 is a flowchart showing a change from the power-save mode to the active mode according to the present invention. In one embodiment, this process is performed entirely in hardware. First, while decreasing the value VWTCR of the wake-up count register one bit by one bit (S1401), the wake-up timer 516 waits until the value VWTCR becomes one.

If the value VWTCR becomes one (S1402), the wake-up timer 516 generates the signal WKUP and the power control unit 509 receives the signal WKUP to disable the signal PLL_PWDN, thereby powering on the PLL 508 (S1403). Thereafter, the value VLOC of the locktime register 505 inputted at the first step of initializing the system is decreased one bit by one bit until the value becomes zero (S1404).

If the value VLOC becomes zero (S1405), the power control unit 509 applies the signals CLK_EN and PLL_STA to supply the clocks to the media access controller (S1406), and the power-save master 502 disables the bus request signal BRQ in response to the signal PLL_STA. Due to the disabling of the bus request signal BRQ, the bus arbiter 507 supplies a bus master signal to other processors in competition with other processors. If another processor becomes the bus master, the bus occupation of the power-save master 502 is expired. The stop bit value VSTB of the clock disable register 504 is cleared in response to the disabled bus request signal BRQ of the power-save master 502 generated when the bus occupation is expired. Since then, the media access controller operates in the active mode.

Figure 15:
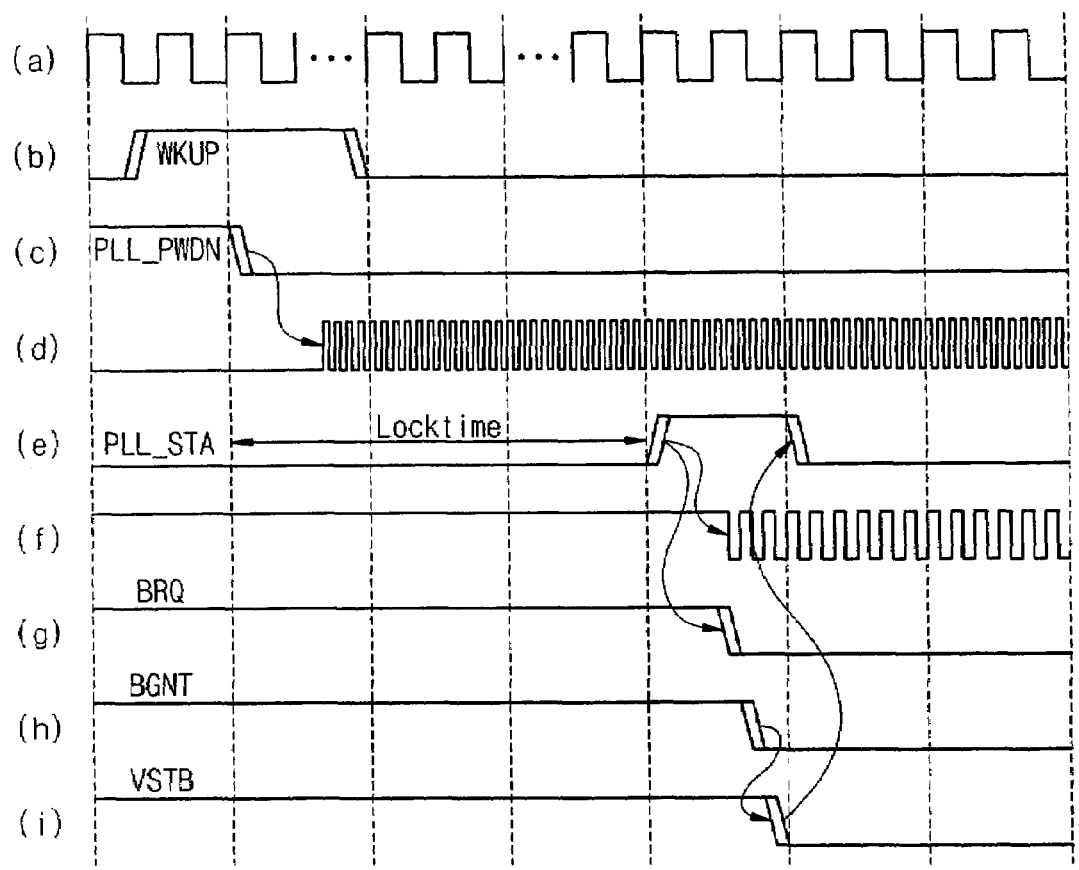
FIG. 15 is a timing chart of signals generated in FIG. 14.

FIG. 15 is a timing chart of hardware in a change to the active mode. In FIG. 15, the (a) waveform indicates an external clock supplied to the PLL 508, and the (b) waveform indicates a generation of the wake-up signal WKUP in step S1402.

The (c) waveform indicates that the signal PLL_PWDN is disabled due to the generation of the signal WKUP at the step S1403, that is, that the PLL 508 is powered on. The (d) waveform indicates an output waveform of the PLL 508 when the power is supplied to the PLL 508. The (e) waveform indicates that the signal PLL_STA is applied when the output of the PLL 508 is settled, that is, when the value VLOC becomes zero. The (f) waveform indicates that the system clock is supplied to the media access controller at the step S1406.

The (g) waveform indicates that the bus request signal BRQ of the power-save master 502 is disabled at the step S1407. The (h) waveform indicates that the signal MST of the bus arbiter 507 is disabled so that the bus occupation of the power-save master 502 is expired. The (i) waveform indicates that the stop bit of the clock disable register 504 is cleared, as described at the step S1408. Since then, the media access controller operates in the active mode.

According to the present invention, power loss is minimized by disabling clocks supplied to all blocks of the media access controller as well as CPU and by disabling power supplied to PLL of the media access controller during the power-save mode. In addition, it is possible to implement the media access controller which can prevent data loss.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A media access controller comprising:
    a local bus for connecting blocks of the media access controller with each other;
    a CPU connected with the local bus to drive the media access controller;
    a register unit connected with the local bus to store information used for software control of the CPU with respect to internal units of the media access controller;
    a host interface unit connected with the local bus to manage an interface between the media access controller and a host;
    a physical layer interface unit connected with the local bus to manage an interface between the media access controller and a physical layer;
    a power-save master for generating a signal for requesting an occupation/occupation expiration of the local bus in response to a signal inputted via the local bus and a value of the register;
    a bus arbiter for generating a signal controlling a use of the local bus in response to the signal generated from the power-save master;

a power control unit for generating signals determining whether to supply clocks and power to the respective blocks of the media access controller, in response to the control signal of the bus arbiter, the register values inputted via the local bus, and a power-save mode exiting signal provided from other blocks of the media access controller;

a phase-locked loop for generating clocks in response to the signal determining whether to supply the power, the signal being generated from the power control unit;

a clock generator receiving the phase-locked clock from the phase-locked loop to generate clocks required to the media access controller, and supplying or disabling the clocks generated according to the signal determining whether to supply the clock, the signal being generated from the power control unit; and a wake-up timer for applying a power-save mode exiting signal to the power control unit in response to the signals inputted from the local bus and the clock generator.

2. The media access controller of claim 1, wherein a direct connection method is employed when supplying the power and clocks to respective processors of the media access controller according to the power-save mode exiting signal.

3. The media access controller of claim 1, wherein the register unit includes a clock disable register and a locktime register.

4. The media access controller of claim 3, wherein the locktime register stores a time required until an output of the phase-locked loop is settled.

5. The media access controller of claim 1, wherein the power control unit generates a plurality of state control signals PLL_PWDN, PLL_STA and CLK_EN for controlling the power and clocks of the media access controller, in response to a first control signal MST from the bus arbiter, a second control signal WKUP from the wake-up timer, a first input value VLOC from the locktime register, and a second input value VSTB from the clock disable register.

6. The media access controller of claim 5, wherein the power-save master generates one signal for requesting the occupation/occupation expiration of the bus, in response to the second input value VSTB from the clock disable register and the signal PLL_STA from the power control unit.

7. The media access controller of claim 6, wherein the power-save master is implemented with one register.

8. The media access controller of claim 1, wherein the power-save master generates one signal for requesting the occupation/occupation expiration of the bus, in response to the second input value VSTB from the clock disable register and the signal PLL_STA from the power control unit.

9. The media access controller of claim 1, wherein the clock generator supplies or disables the clocks to the respective blocks of the media access controller in response to any one of the state control signals generated from the power control unit.

10. The media access controller of claim 1, wherein the wake-up timer includes a wake-up time register for storing a time DTIM and a wake-up count register for counting the time DTIM.

11. The media access controller of claim 9, wherein the wake-up timer copies the time DTIM of the wake-up time register into the wake-up count register in response to a control signal MST from the bus arbiter in the power-save mode, and counts a value of the wake-up time register in synchronization with a low-speed clock divided from the clock generator.

* * * * *